Figure 1:
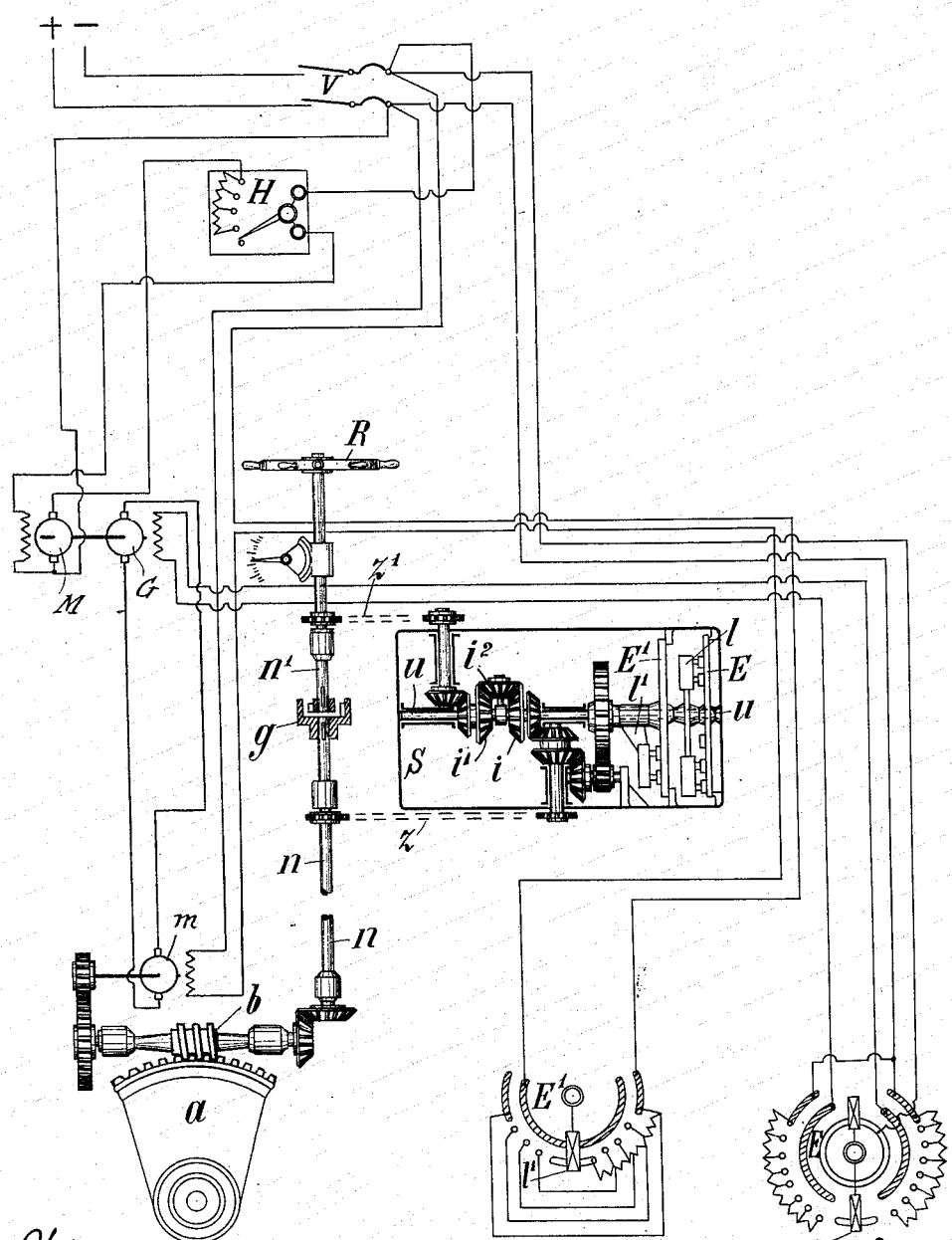

V. LOCARNI.
DOUBLE GEAR FOR CONTROLLING ELECTRICALLY AND BY HAND DEVICES PLACED AT A DISTANCE.
APPLICATION FILED FEB. 14, 1913.

1,135,596.

Patented Apr. 13, 1915.
2 SHEETS—SHEET 1.

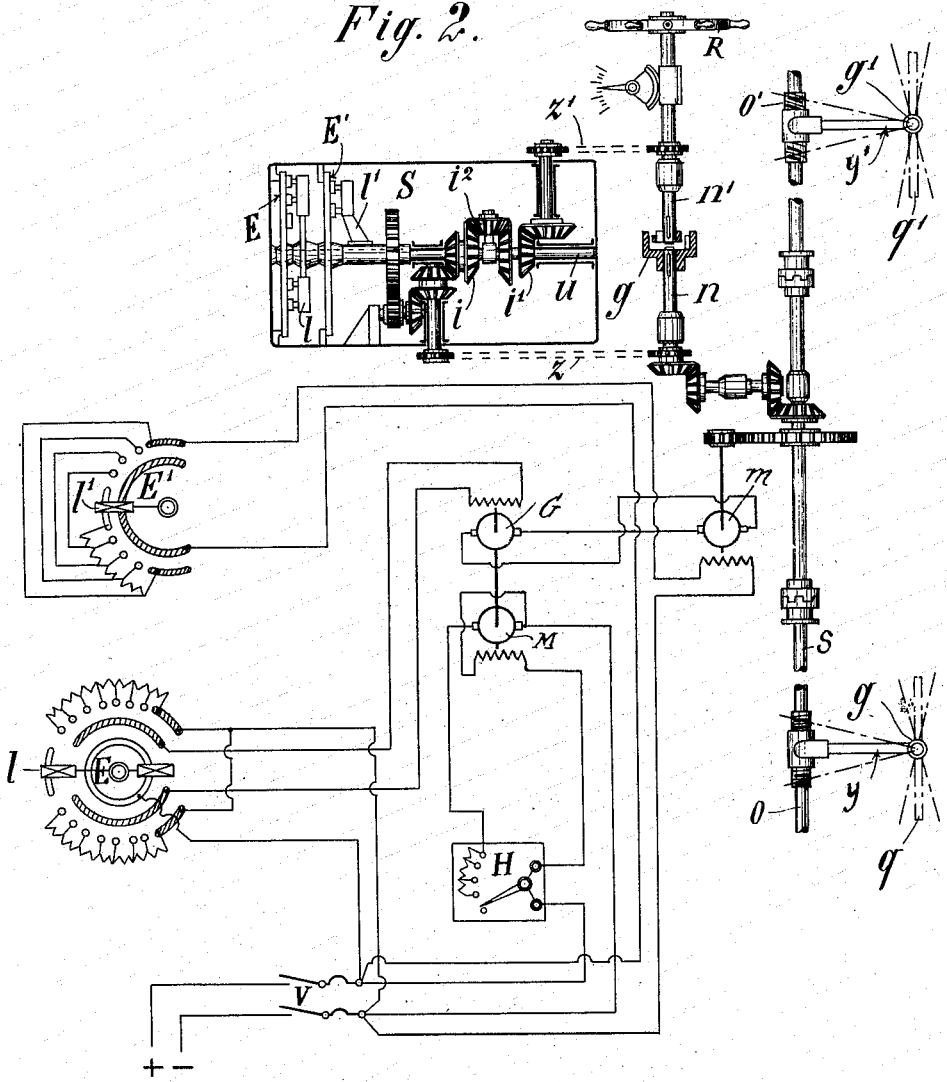
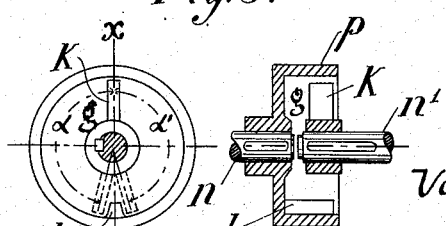

UNITED STATES PATENT OFFICE.

VITTORIO LOCARNI, OF CORNIGLIANO LIGURE, ITALY.

DOUBLE GEAR FOR CONTROLLING ELECTRICALLY AND BY HAND DEVICES PLACED AT A DISTANCE.

1,135,596.  Specification of Letters Patent.  Patented Apr. 13, 1915.

Application filed February 14, 1913. Serial No. 748,377.

*To all whom it may concern:*

Be it known that I, VITTORIO LOCARNI, a subject of the King of Italy, residing at Cornigliano Ligure, in the Province of Genoa, Kingdom of Italy, have invented certain new and useful Improvements in Double Gear for Controlling Electrically and by Hand Devices Placed at a Distance, of which the following is a specification.

The object of the present invention is a double gear for controlling movable parts of devices placed at a distance by means of two driving powers, that is to say by hand power and by a mechanical power. By means of this double gear the operator may avail himself of the mechanical power, thus being relieved of the excessive fatigue especially in the case of movable parts the handling of which requires a considerable strength, or he may at will act upon the said parts solely with his muscular strength without having recourse to mechanical powers. The double gear is controlled by a single steering wheel, by means of which the operator rotates the main shaft and thus causes the mechanical power to act on the driven parts and to keep open a coupling designed to allow, when closed, the direct transmission of the hand-power, while, if the mechanical power fails to work, or it is purposely excluded by means of a switch, the coupling provided on the main shaft becomes closed upon the operator further rotating the steering wheel, and thus the connection for direct transmission of hand-power becomes automatically operative, and the control goes on without interruption.

This device may find conveniently application in various cases; here, by way of example, and without intending to limit thereby the scope of the invention, reference is had to the application of the device for steering ships' rudders, and especially vertical and horizontal rudders of submarine boats. The mechanical power, which is designed to assist the operator in performing his duty, can be of any kind, but here it is supposed to be supplied by electricity.

According to the example shown in the drawing, the main shaft, which starts from the steering wheel, besides carrying the coupling mentioned above for the direct transmission of the hand-power, has connections, on both sides of the coupling, which act on the electrical machinery, in order to render concordant the action of the electrical power with the movements of the steering wheel, when current is allowed to circulate in the feeding line.

In the annexed drawing, which by way of example represents an embodiment of the invention, Figure 1 shows the whole plant of the steering gear for the vertical rudder; Fig. 2 shows the whole plant of the steering gear for the horizontal rudders, and Fig. 3 shows on an enlarged scale a front view and a section through the joint of the shaft of the steering wheel with the steering gear of the rudder or of the rudders.

The two plants shown in Figs. 1 and 2 are nearly identical; therefore, the same reference letters are applied to corresponding parts in both figures.

In the said Figs. 1 and 2 are shown two rheostats —E— and —$E^1$— with the respective controlling levers —$l$— and —$l^1$—; for clearness' sake these parts are shown twice in each figure, namely once in a side view together with the gearings of the differential gear provided upon the driving shaft connected to the steering wheel, and a second time separately for each rheostat, these being diagrammatical and plane views, in order to better show the respective electric circuits.

The steering gear for the vertical rudder shown in Fig. 1 comprises: a sector —$a$— of a worm wheel mounted upon the rudder's head, meshing with an endless screw —$b$— which can be driven either by an electric motor —$m$— with the aid of suitable transmissions interposed, or by means of the shafts —$n$— and —$n^1$—, the latter of which is fastened to the steering wheel —R— controlled by the helmsman. The connection between the shaft —$n$— and the shaft —$n^1$— is established by the coupling —$g$— (Fig. 3).

The portion of the shaft —$n^1$— extending toward the wheel —R— carries an arm —K— projecting radially and fastened upon the shaft itself, while upon the portion —$n$— extending toward the gear of the rudder is fastened a cylindrical drum —$p$— which has an inside projecting tooth —$d$—. Therefore, by causing the wheel —R— to rotate in one direction or in the other, the rudder is controlled by hand when the tooth —K— meets with the tooth —$d$— on the one or on the other side. In other words the wheel —R— starting from the central position, which in Fig. 3 corresponds to the line x—x, has to run out the dead angle α before producing the motion of the rudder in one direction, or the same dead angle α¹, but on the opposite side, before producing the motion in the opposite direction. These two angular spaces which remain inactive with respect to the movement of the hand operated rudder are utilized and become active for the movement of the rudder when the latter is steered by means of the electric motor.

The electrical steering gear comprises: a driving motor —m— fed by direct current and having separate excitation; a motor-generator set —T— formed by a direct current generator —G— with separate excitation and coupled to a motor —M— which in the drawing is also supposed to be an electric motor, but which may be a motor of any other type; a rheostat —H— for starting this latter motor; a differential regulator —S—. This regulator receives its motion from two separate transmissions —z— and —z¹— ending to the shafts —n— and —n¹— respectively. The transmission —z¹— which is connected to the wheel —R— by means of suitable gearings, moves the bevel pinion —i¹— of a differential gear, while the transmission —z— by means of a suitable gearing moves the other bevel pinion —i— of the same differential gear. Both of said pinions turn loose around the shaft —u— —u—. Upon said shaft are fastened the shaft of the intermediate bevel pinion —i²— of the differential gear and the contact-carrying lever —l— of the rheostat —E—. The said rheostat —E— controls the excitation of the generator —G— of the motor-generator —T— and when the steering wheel is in such a position that the arm —K— of the coupling —G— lies in the position x—x, as shown in Fig. 3, the lever —l— of the rheostat is in the off position, as indicated in Fig. 1, viz:—It does not allow of any current passing to the exciting circuit of —G—. By turning the wheel —R— in one direction, the lever —l— by means of the differential gear is rotated, thus causing the current in the exciting circuit of —G— to circulate in a given direction and with an intensity which depends upon the position of the lever with respect to the graduation of the resistances and which starting from a minimum, after the off position, reaches its maximum at the end of the rotation of the lever —l—. By turning the wheel —R— in the contrary direction, the same effects are produced in the exciting circuit of —G—, but with current circulating in opposite direction. Further the regulator —S— carries a second rheostat —E¹—, the controlling lever —l¹— of which, loose upon the shaft —u— —u—, is rotated by means of the transmission —z— without interposition of the differential gear. The said rheostat —E¹— controls the excitation of the driving motor —m—, and when the sector —a— of the rudder's head occupies its central position, as shown in Fig. 1, the lever —l¹— lies also in the central position, as illustrated in the drawing, in which position only a very weak current is allowed to pass into the exciting circuit.

When the sector —a— is rotated in the one or in the other sense, the lever —l¹— by means of the shaft —n— and of the transmission —z— is also shifted in the one or in the other direction and moving away from the central position allows the passage into the exciting circuit of a current, the strength of which increases by and until at the end of the rotation of the lever it reaches the lightest value. The devices are arranged in such a way that the two positions of the lever —l¹— at the end of its rotation correspond with the two positions of the sector —a— of the rudder at the end of its rotation. In other words by and by as the angle of the rudder, starting from the central position, is increasing, there increases also in a predetermined proportion the excitation of the motor and consequently its driving torque.

After having thus described the different parts of the device, it will now be easy to understand the working of the same.

After having closed the line switch —V—, the motor —M— of the transformer —T— is started by means of the rheostat —H— and therefore the generator —G— coupled thereto; supposing now that the electrical connections between the different parts are those shown in Fig. 1, the steering gear is ready to be driven electrically. If the different parts are in the positions shown in the drawing, no movement takes place, but as soon as the wheel —R— is rotated through a small angle in any direction whatever, also the shaft —n¹— rotates driving the transmission —z¹—, whereby the lever —l— of the rheostat —E— is rotated by means of the pinion —i²—; the generator —G— is thus excited and consequently sends current to the motor —m— which, being continuously excited, starts moving in the corresponding direction, the driving torque and the speed being thereby determined by the positions of the levers —l— and —l¹— upon the respective rheostats —E— and —E¹—. However, the motor when rotating transmits its movement to the shaft —n— and therefore to the transmission —z— until the lever —l— by means of the pinion —i²— has again reached the initial off position. In these conditions the motor —m— is immediately stopped, for, as thereby no exciting current is further sent in the generator —G—, the generator —G— and the motor —m— become inoperative and, by conveniently establishing the ratios of transmission, the tooth —d— of the coupling —g— carried by the shaft —n— will have rotated by the same angle and in the same direction as the arm —K— of the shaft —n¹— which has produced the movement. In other words as long as current is flowing in the circuits, the tooth —d— constantly runs behind the arm —K— whatever the sense of rotation of the steering wheel —R— and the working speed comprised between a minimum and a maximum to be established, and in any position the wheel —R— will stop, the tooth —d— necessarily stops in a position diametrically opposite to that of the arm —K—. If no more current passes in the circuits, the tooth —d— stops following the arm —K— and in this case the latter, prosecuting its motion due to the rotation of the wheel —R— by means of the tooth —d— establishes the immediate connection with the shaft —n— and without it being necessary to perform any special operation, allows of the rudder being further steered by hand, thereby always acting upon the same wheel —R—.

The steering gear for the horizontal rudders, represented in Fig. 2, comprises the same parts mentioned in describing the steering gear for the vertical rudder; consequently, these parts are indicated with the same reference numerals.

There is only a difference in the mechanical arrangement which for clearness' sake has been shown diagrammatically, —q— and —q¹— representing the horizontal rudders, which may rotate around the respective axes —y— and —y¹—, while —O— and —O¹— indicate the screws which when rotating cause the rudders to be swung in the same or in the opposite direction, and —s— represents a shaft which, by means of suitable clutches, may connect or disconnect the rudders, in order to obtain the simultaneous or independent control of their movements.

Although the horizontal rudders shown in the drawing are of the ordinary type, that is to say turning around a horizontal axis, it is to be understood that the device may also be applied to rudders of any other type, for instance to those with outward or variable projection or otherwise fitted.

Suitable transmissions connect the shaft —s— with the motor —m— and with the shaft —n—.

Having now fully described this my invention, and how the same is to be carried out, I declare that what I claim is:—

In a double-acting steering gear of the class described the combination of a steering wheel, a shaft formed in two portions, that is a driving and a driven portion, a steering wheel connected to the driving portion, a steering gear driven by an electric motor connected to the driven portion of the shaft, a mechanical coupling between the two portions of the shaft allowing a limited amount of relative rotation of the one in respect of the other, controlling electrical devices for starting, stopping, and reversing the motor, and connections on both sides of the clutch with said controlling electrical devices in such a manner that on rotating the steering wheel the motor is started and the rudder gear thus actuated rotates also the driven part of the shaft, and thereby the controlling devices are caused to stop the motor as soon as the rudder has taken the position shown by the steering wheel, while, if the motor fails to operate, the mechanical coupling transmits directly to the rudder gear the hand-power acting on the steering wheel.

In witness whereof I have hereunto set my hand in the presence of two subscribing witnesses this 21st day of January 1913.

VITTORIO LOCARNI.

Witnesses:
 GIUSEPPE PARODIL,
 EMILIO BORIO.